(No Model.)
W. B. MURPHY.
FASTENING DEVICE FOR GLOVES.
No. 545,906. Patented Sept. 10, 1895.
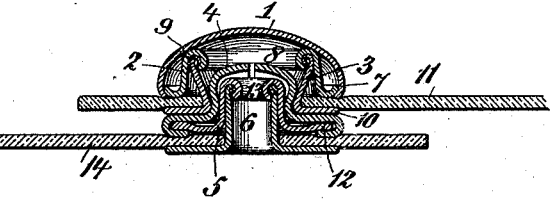
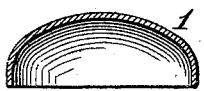 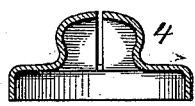
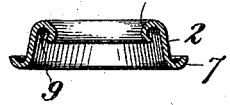 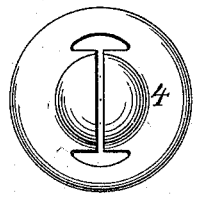 
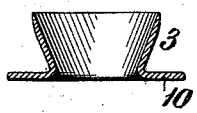 
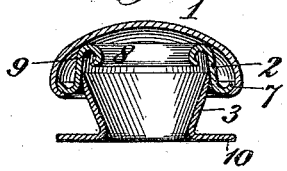 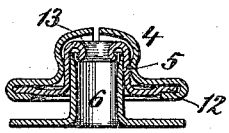
Witnesses:— 
D. H. Haynort
Wm. H. Buckingham.
Inventor:
William B Murphy

UNITED STATES PATENT OFFICE.

WILLIAM B. MURPHY, OF BROOKLYN, ASSIGNOR TO LUCIUS N. LITTAUER, OF NEW YORK, N. Y.

FASTENING DEVICE FOR GLOVES.

SPECIFICATION forming part of Letters Patent No. 545,906, dated September 10, 1895.

Application filed May 20, 1895. Serial No. 549,954. (No model.)

*To all whom it may concern:*

Be it known that I, WILLIAM B. MURPHY, a citizen of the United States, residing at Brooklyn, in the county of Kings and State of New York, have invented certain new and useful Improvements in Fastening Devices for Gloves and other Articles, of which the following is a specification.

My improvements relate to those forms of fastening devices for gloves and other articles which have a socket member and a stud member, the latter being adapted to be fastened to one flap and to occupy the socket member fastened to the other flap of the glove or other article, and my improvements are directed to the production of a simple, efficient, and readily and yet firmly applied form of fastening both for the socket and the stud member of the fastening.

In my improved fastening both the socket and the stud elements of the fastening are made with three parts, and the functions of the three parts are largely identical in both elements. In each there is a top or cap portion, (which in the socket member is a covering for the socket and in the stud member is a split stud,) an annulus having an inturned lip, and an eyelet whose upper end is adapted to be turned over inward by said lip when the fastening is applied to the glove or other article.

In the accompanying drawings, Figure I is a vertical sectional view of the entire fastening applied to the two flaps of a glove or other article. Fig. II is a vertical sectional view of the cap of the socket. Fig. III is a similar view of the anvil-annulus. Fig. IV is a similar view of the eyelet. Fig. V is a similar view showing the eyelet in the initial position within the cap when the socket is to be fastened to the glove or other article. Figs. VI, VII, VIII, and IX are views exactly corresponding to Figs. II, III, IV, and V, but showing the same parts on the stud part of the fastening. Fig. VIª is a top view of the cap part of the split stud.

The socket part of the fastening consists of the cap 1, an annulus 2, adapted to act as an anvil, and an eyelet 3. The stud part of the fastening consists of the split cap or stud proper 4, the anvil-annulus 5, and the eyelet 6. The parts are slightly modified in shape, as shown in the drawings, according to whether they are for use on the socket or the stud.

The cap 1, Fig. II, is or may be of dome shape. It is fastened to the annulus 2 by turning over its lower edges, as shown in Fig. V. The annulus 2 is, in cross-section, of S shape, having a tubular body with a lower lip 7 turned out to engage under the upset lower edge of cap 1 and the upper inturned lip 8 to receive the upper edge of the eyelet 3. The lip 8 is turned over inward and then bent downward and outward, so as to leave at 9 just sufficient space to allow the upper edge of the eyelet 3 to pass into the chamber provided in the annulus by the inturning of the lip 8. The eyelet 3 is preferably flared, as shown in Fig. IV, and made of weaker material at its upper edge and for the main portion of its height, and the annulus 2 has its body slightly tapered upward. The eyelet 3 has at the bottom the usual flange 10. When the eyelet 3 is placed within the annulus 2 of the socket, as shown in Fig. V and forced upward, it will be first started in turning over by the taper of the annulus 2, and then the upsetting of its upper edge will be completed as it reaches the lip 8 until it is forced over to make a perfect anchor within the inturned lip, as shown in Fig. I, so that the socket will be held firmly on the flap 11 of the glove in such manner as to provide a seat of sufficient diameter and depth for the stud.

Referring to the stud, its cap part 4 is split to give a necessary resiliency to the stud, and its lower edges are adapted to be turned over the flange 12 of the annulus 5. The annulus 5 corresponds in shape and function with the annulus 2 of the socket part of the fastening, except that it is preferably cylindrical in shape, as shown in Fig. VII, and has the flange 12, instead of the curved lip 7, corresponding to the annulus 5. The flange 12 is slightly dished, as shown, so as not to interfere with the spring action of the split cap when the parts are fastened together. The eyelet 6 of the stud is preferably cylindrical in shape, as shown in Fig. VIII.

In Fig. IX, I have shown the parts of the stud in the same relation that the similar parts of the socket have in Fig. V—that is to say, with the eyelet 6 placed within the annulus 5 in readiness to be forced into the same, so that its upper edge may be turned over by the lip 13 thereof, fastening the parts of the stud together and to the flap 14 of its glove or other article, as shown in Fig. I.

Having thus described my invention, the following is what I claim and desire to secure by Letters Patent:

1. In a fastening for gloves and other articles, the combination of a cap piece, an annulus held within said cap piece and having its upper edge turned inward, downward and outward and the flanged eyelet adapted to be forced into and turned over inwardly at its upper edge by said annulus, thus holding the fastening together and to the fabric, substantially as set forth.

2. In a fastening for gloves and other articles, the combination of a cap piece, the annulus of S-shape in cross section having the tubular part, the lower out-turned lip 7 and the upper in and downwardly turned lip 8 and the flanged eyelet, all arranged and adapted to operate substantially as set forth.

3. In a fastening for gloves and other articles, the combination of the cap piece, the annulus having the out-turned lower lip, the tapering body and the inturned upper lip and the eyelet adapted to co-operate therewith, substantially as set forth.

4. In a fastening for gloves and other articles, the socket member consisting of the cap 1, the annulus 2 having lower lip 7 adapted to be engaged by the lower edges of said cap and the inturned lip 8 turned so as to provide an opening 9 between its edge and the body of the annulus and the eyelet 3 having flange 10, and a tubular part whose edge is adapted to engage the inturned lip 8 of the annulus 2 and be turned over inwardly thereby, all arranged and adapted to operate substantially as set forth.

5. In a fastening for gloves and other articles, the stud member consisting of the spring cap 4, the annulus 5 having cylindrical body, the flange 12 and inturned lip 13 and the flanged eyelet 6, having a tubular body whose edge is adapted to meet and be turned over by the said lip 13 thus holding the parts together and to the fabric, substantially as set forth.

6. In a fastening for gloves and other articles, the stud member consisting of the split cap 4, the annulus 5, having dished flange 12 and a suitable lip adapted to act as an anvil and the cylindrical flanged eyelet 6, substantially as set forth.

WILLIAM B. MURPHY.

Witnesses:
BERNARD H. GREFE,
WM. H. BUCKINGHAM.